Aug. 4, 1970  K. S. BOWEN  3,522,991
PHOTOGRAPHIC COPYING APPARATUS
Filed Jan. 25, 1967  2 Sheets-Sheet 1
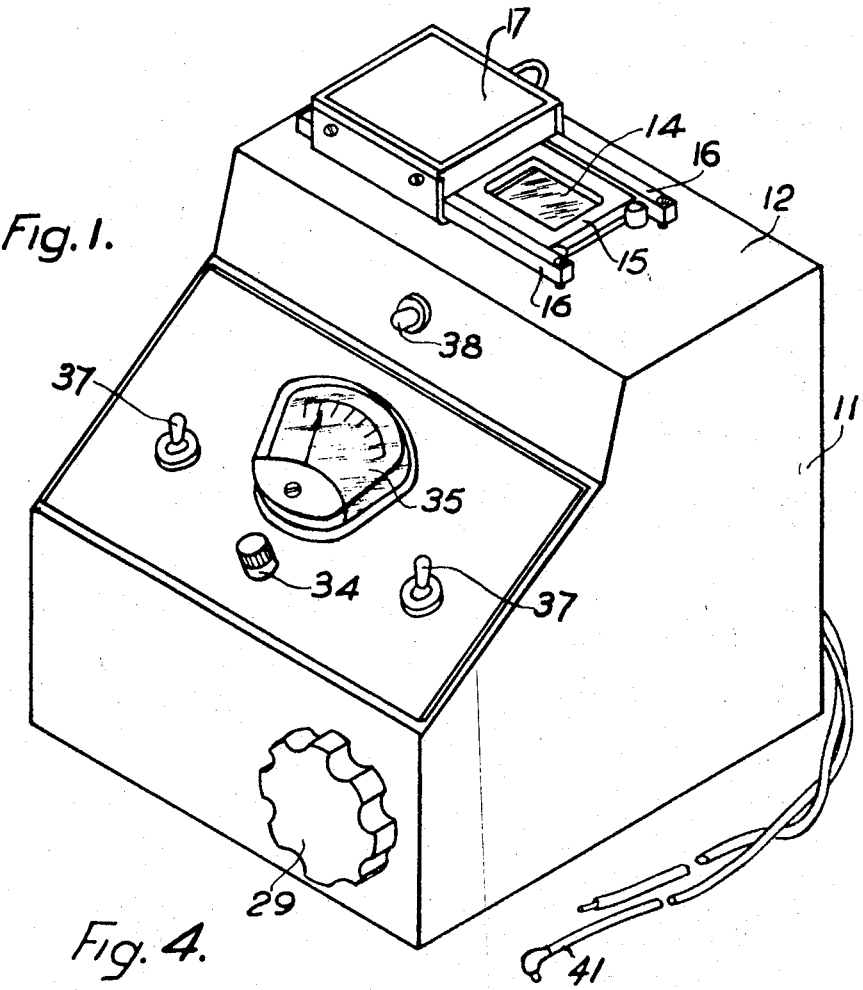
Fig.1.
Fig.4.
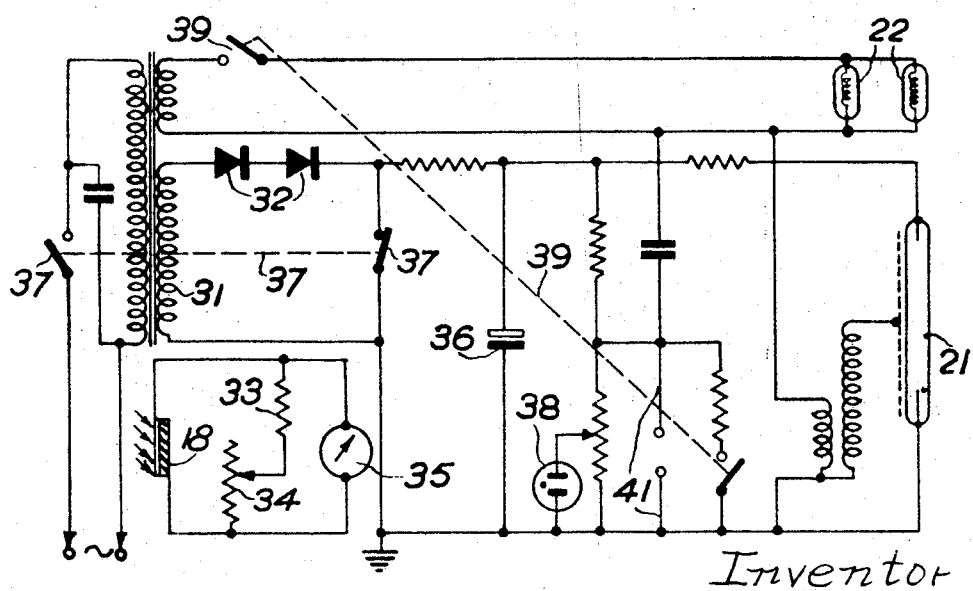
Inventor
K. S. Bowen
By Watson Cole Grindle & Watson
Attys.

Inventor
K. S. Bowen

United States Patent Office 3,522,991
Patented Aug. 4, 1970

3,522,991
PHOTOGRAPHIC COPYING APPARATUS
Kenneth Samuel Bowen, 9 Gerrard St.,
London, W. 1, England
Filed Jan. 25, 1967, Ser. No. 611,675
Int. Cl. G03b 27/78
U.S. Cl. 355—83 2 Claims

ABSTRACT OF THE DISCLOSURE

A photographic copying apparatus with a movable support for a light source having mechanical elements to displace the support and an electrical measuring instrument to indicate the output of a photocell used for measuring film density. First and second mechanical elements are provided to operate said photocell support and a light source also is provided to selectively control the level of illumination during light measurement by said photocell.

---

This invention relates to photographic apparatus for copying transparencies (whether positive or negative) and is concerned with determination of correct exposure. The problem is especially acute in the copying of color transparencies since the material has only a small tolerance in respect of exposure. Further, if the duration of the exposure is fixed, as is often convenient, the exposure value can only be varied by varying the intensity of illumination, which also presents problems.

For general subjects, a suitable guide to the calculation of exposure is the average density which can be measured by transmitting light from a source of known power and integrating the light transmitted through the whole or a substantial fraction of the area of the transparency by means of a photoelectric cell. The present invention employs this mode of measurement.

The apparatus according to the invention comprises a photoelectric cell which can be brought into a position to integrate the effect of light coming through the whole or a substantial fraction of the area of the aperture in a support adapted to receive a transparency to be copied, an electrical measuring instrument to which the output of the cell is supplied, and light source means by which light can be directed through the aperture in the support while the cell is in integrating position, also includes light source means by which light can be directed through the aperture in the support for making an exposure with the cell out of the light path, and the light source means for both purposes are so relatively arranged and displaceable in unison towards and away from the transparency support, that the intensity of illumination for measurement and that for exposure are varied according to the same law (inverse square law). It follows from this that so far as average density of the transparency is a correct guide, once the instrument reading has been ascertained which, without further displacement of the light source means, gives the correct exposure for a given output of the light source means used for exposure, correct exposure will be obtained for any other transparency by displacing the light source means to a position which gives the same instrument reading as before, faults in density of different transparencies being automatically compensated. By suitable choice of the parameters of the various factors and components involved, this reading can be given a convenient value and this value can be permanently marked on the instrument. Further if the density of a transparency to be copied differs so much from that of a good transparency that within the range of movement of the light source means the instrument cannot be brought to the mark, other marks may be provided indicating factors by which the exposure shuold be multiplied, the necessary correction then being applied by the operator by making a corresponding adjustment of the stop value of the camera used for copying. These additional marks also assist in making similar adjustments for the case of transparencies of which it is subjectively judged that owing to their high contrast range, subject or other factor, an overall integration by the photoelectric cell does not provide a suitable guide to the correct exposure. Observation of the transparency for this purpose is easily made with the measuring light source illuminated and the photoelectric cell out of the way.

It will be noted that the illumination of the transparency is varied as necessary without any need for varying the intensity of the light source themselves so that the complications which would arise if such intensity variations had to be made, are eliminated. Also since the two light source means are displaced together, the variation in illumination which they produce at the transparency is always the same for both as long as the sources themselves do not change in relative intensity.

Both light source means could in fact be constituted by the same actual light source. As a rule however this is undesirable because to keep the exposure time conveniently short, a high power light source is needed for the exposure, leading to excessive consumption of electricity and heating if this is run continuously.

The same incandescent electric lamp or group of lamps could be used without this disadvantage, by over-running (i.e., energizing at higher than raised voltages) the lamp or group during exposure and under-running (i.e., energizing at lower than rated voltage) it at other times. Since the variation of light output is at a high power of the supply voltage and the values are affected by the aging of the lamp or lamps the errors to which such a system is liable may be rather higher than is desirable.

It is preferred therefore to use a small incandescent lamp or lamps run at rated voltage for the exposure measurement, and an electronic flash tube for the exposure, the same energy input to the tube being used for each exposure.

The invention can be applied in apparatus in which the light is concentrated on the trasparency by a condenser system but as this would usually involve the condenser system being moved with the light sources but following a different law, the invention is simpler to apply in apparatus which employs only a diffusing screen between the light source and the transparency. A convenient arrangement is then a support displaceable towards and away from the screen carrying an electronic flash tube (supplied from a capacitor incorporated in the apparatus) along the center and a bulb on each side of the tube, those two bulbs together constituting the light source used for measurement. The photoelectric cell may suitably be a selenium cell of appropriate area.

It may here be mentioned that the instrument reading obtained with the light source at a predetermined position is a measure of the density of the transparency and this information may be useful for other purposes altogether.

The illumination of the transparency by the measuring light may also be made use of in focusing a camera, where such is being used to do the copying. The illumination can be adjusted to any convenient value for this purpose within the compass of the apparatus without affecting the operations of measurement and exposure.

One convenient construction of apparatus according to the invention is shown by way of example in the accompanying drawings in which:

FIG. 1 is a perspective of the complete apparatus,

FIG. 4 is a circuit diagram.

Figure 2:
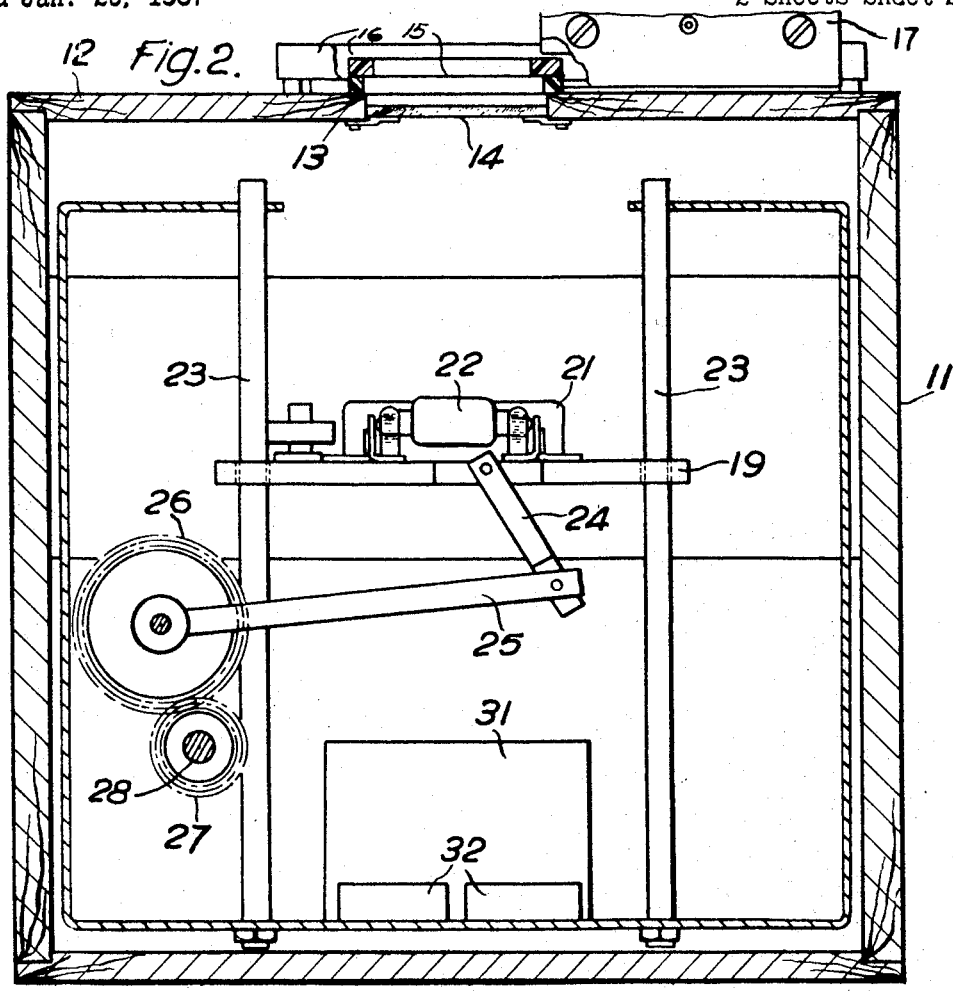
FIG. 2 is a sectional view from the rear with certain parts omitted.
Figure 3:
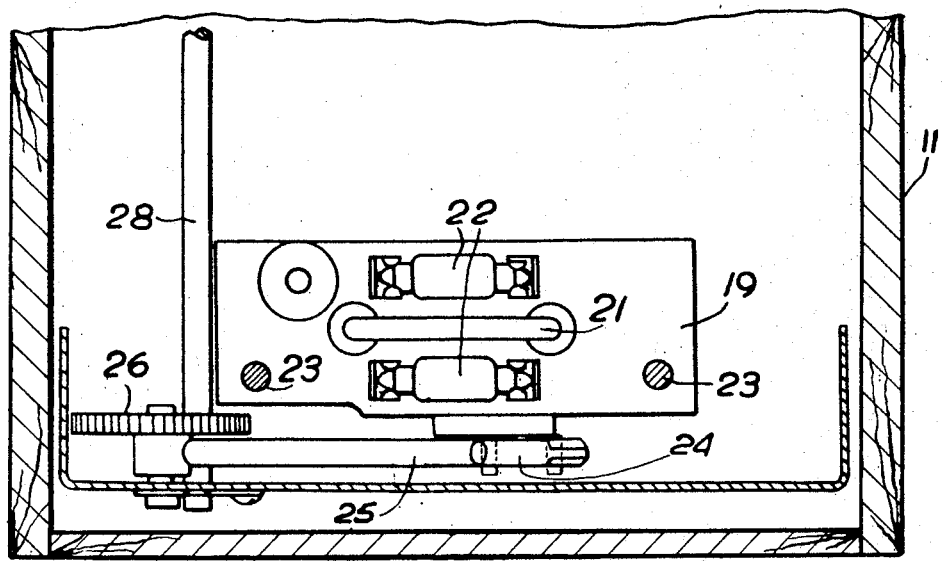
FIG. 3 is a detail sectional plan view showing the support with the light sources.

The apparatus shown in FIGS. 1 through 3 includes a casing 11 of wood and sheet metal which has a flat top 12 with an aperture 13 (FIG. 2) of appropriate size covered below by a diffusing screen 14 and surmounted by a removable frame 15 to receive a transparency. Slide rails 16 guide a case 17 in which the photoelectric cell 18 (FIG. 4) is housed, laterally into and out of position over the frame 15. Within the casing 11 as shown in FIGS. 2 and 3, a horizontal flat support 19 for an electronic flash tube 21 and bulbs 22 is guided by vertical guide rods 23 and can be raised and lowered through a link 24 connected to a crank arm 25 on a toothed wheel 26 driven by a pinion 27 on a shaft 28 which carries a hand knob 29 (FIG. 1) outside the front of the casing. Sufficient friction is provided so that when an adjustment has been made, the parts will remain as adjusted.

It will be understood that where the same lamps are to be used both for the original measurement and for the exposure, the tube 21 will be omitted and the bulbs 22 probably be of larger size and possibly greater in number. Under-running and over-running can be determnied by suitable choice of the bulbs themselves and the provision of a resistance which is switched in during under-running.

In the example illustrated integration is effected over the whole area of the transparency but a substantial fraction only of the area may be more convenient in some cases. This can be simply determined by the size of the cell 18 and the aperture in the case 17.

In the present example the cell 18 is a photovoltaic selenium cell which is connected to an instrument 35 (FIG. 1) of appropriate sensitivity carried on a sloping surface of the front of the casing 11 above the level of the hand knob 29, a fixed resistor 33 (FIG. 4) and rheostate 34 (FIGS. 1 and 4) serving as a calibrating control. Alternatively a purely resistant type of cell could be used, a suitable supply being drawn from the transformer now to be described with reference to FIG. 4.

This transformer 31 and a rectifier 32 provide a D.C. supply for charging a capacitor 36 for supplying the tube 21 within the casing. A switch 37 is provided for the main supply, an indicating lamp 38 showing when the supply is on. Another switch 39 in one position switches on the festoon bulbs 22 and in the other position prepares the circuit for the exposure. A lead 41 from the apparatus to the shutter of the camera used for copying, enables the flash to be fired in synchronism with the shutter by the contacts commonly provided in the shutter for the purpose. The flash tube circuit includes various components shown in FIG. 4 which will be familiar to those skilled in the art without further description.

It will be understood that the apparatus has to be coordinated with the sensitivity of the material used for copying. The apparatus is designed so that the instrument gives the standard indication when a good transparency of average density and contrast is on the support and the knob 29 is turned to a position (mdae visible by marks on the knob and casing 11) which provides a suitable (say half) fraction of the illumination of the support provided with the light sources at their position closest to the support; any necessary adjustment of the instrument indication is made by the aid of the rheostat 34. A series of trial exposures are now made, the actual exposure being varied by varying the stop aperture of the camera. From the trial exposures the correct stop value for the parameters of the apparatus and of the sensitive material is selected, and thereafter no further adjustment is necessary until a change in one of the parameters (which include the relative light output of the tube 21 and bulbs 22) occurs.

What I claim is:

1. Photographic copying apparatus in combination, fixed support means defining an aperture to receive a transparency to be copied, light source means mounted for displacement towards and away from said aperture and arranged when energized to illuminate a transparency received in said aperture, a photoelectric cell mounted on a movable support, first mechanical means for displacing said cell support between a first interposed position in which said cell receives and integrates light from said source means through at least a portion of a transparency received in said aperture and a second withdrawn position in which said cell is out of the light path of the copying apparatus, an electrical measuring instrument connected to receive and indicate the output of said cell, second mechanical means for displacing said light source means relative to said transparency support to vary the display obtained on said instrument with said cell in said interposed position and said source means energized, and means for slectively controlling the energization of said source means to provide a relatively low level of illumination during measurement with said cell in interposed position and a relatively high level of illumination during exposure with said cell in withdrawn position.

2. Apparatus according to claim 1 in which movement is imparted to the light source means by the aid of a crank arm and connecting link.

References Cited

UNITED STATES PATENTS

| | | | |
|---|---|---|---|
| 769,343 | 9/1904 | Hinne | 355—119 |
| 895,034 | 8/1908 | McIntire | 355—113 |
| 2,200,719 | 5/1940 | Morgan | 355—120 |
| 2,420,141 | 5/1947 | Lessler | 355—99 |
| 3,402,636 | 9/1968 | Gemmer et al. | 355—68 |
| 2,530,396 | 11/1950 | McGuffin | 95—73 X |
| 2,633,784 | 4/1953 | Cofield | 95—73 |
| 2,763,180 | 9/1965 | Beck | 95—73 X |
| 2,869,447 | 1/1959 | Youngberg | 95—73 |
| 3,020,801 | 2/1962 | Lander et al. | |
| 3,074,312 | 1/1963 | Olson. | |
| 3,102,463 | 9/1963 | Biedermann et al. | 95—73 |
| 3,164,056 | 1/1965 | Wick et al. | |
| 3,183,766 | 5/1965 | Takasaka et al. | 95—73 X |
| 3,339,451 | 9/1967 | Shaifer. | |
| 3,375,751 | 4/1968 | Engborg et al. | |

NORTON ANSHER, Primary Examiner

R. L. MOSES, Assistant Examiner

U.S. Cl. X.R.

355—68, 69, 38